United States Patent
Dahl et al.

(10) Patent No.: US 8,452,883 B2
(45) Date of Patent: May 28, 2013

(54) METHOD FOR DATA TRANSMISSION

(75) Inventors: Martin Dahl, Espelkamp (DE);
Andreas Stelter, Minden (DE); Marcel Schilg, Warmsen (DE)

(73) Assignee: ABB Patent GmbH, Ladenburg (DE)

( * ) Notice: Subject to any disclaimer, the term of this patent is extended or adjusted under 35 U.S.C. 154(b) by 554 days.

(21) Appl. No.: 12/002,757

(22) Filed: Dec. 19, 2007

(65) Prior Publication Data

US 2008/0155115 A1 Jun. 26, 2008

(30) Foreign Application Priority Data

Dec. 20, 2006 (DE) .......................... 10 2006 060 214

(51) Int. Cl.
*G06F 15/16* (2006.01)
(52) U.S. Cl.
USPC .......................................................... 709/230
(58) Field of Classification Search
USPC ................................................. 709/230, 232
See application file for complete search history.

(56) References Cited

U.S. PATENT DOCUMENTS

| | | | |
|---|---|---|---|
| 2003/0236937 A1* | 12/2003 | Barros De Almeida et al. | 710/305 |
| 2005/0125085 A1 | 6/2005 | Prasad et al. | |
| 2005/0276233 A1* | 12/2005 | Shepard et al. | 370/254 |
| 2006/0123129 A1* | 6/2006 | Toebes et al. | 709/230 |
| 2006/0291438 A1* | 12/2006 | Karschnia et al. | 370/338 |
| 2007/0019641 A1* | 1/2007 | Pai et al. | 370/389 |

OTHER PUBLICATIONS

German Office Action.

* cited by examiner

*Primary Examiner* — Wing F Chan
*Assistant Examiner* — Andrew Woo
(74) *Attorney, Agent, or Firm* — Buchanan Ingersoll & Rooney PC

(57) ABSTRACT

The disclosure relates to a method for data transmission between a field device and an operating device, wherein the field device is designed to communicate with a higher-level device using a fieldbus protocol in order to perform an automation engineering task, and wherein the operating device is designed as a master for bit-serial point-to-point communication using a packet-based transmission protocol. It is proposed to encode the data to be transmitted according to the specification of the fieldbus protocol, and to carry it over the transmission channel using the packet-based transmission protocol.

3 Claims, 2 Drawing Sheets

METHOD FOR DATA TRANSMISSION

RELATED APPLICATION

This application claims priority under 35 U.S.C. §119 to German Patent Application No. 10 2006 060 214.5 filed in Germany on 20 Dec. 2006, the entire contents of which are hereby incorporated by reference in their entireties.

TECHNICAL FIELD

A method for data transmission between a field device and an operating device is disclosed.

BACKGROUND INFORMATION

Known field devices for automation engineering are designed to communicate with a higher-level device using a fieldbus protocol in order to perform an automation engineering task. For this purpose, these field devices have an interface for connecting to the fieldbus during, and for the purpose of, the intended use. In the simplest implementation, the HART protocol is used here for field communication.

In addition, the field device can be equipped with an additional interface for connecting to an operating device. This operating device is connected to the field device for configuration, commissioning, maintenance or updating firmware. For complex operating procedures, a personal computer has proved particularly useful as the operating device, in particular in its mobile form as a laptop or notebook. Field devices that can be operated in such a way are accordingly equipped with a UART-compatible standard interface for direct connection to the personal computer.

The disadvantage is that the UART standard interface supports only low data transfer rates and its operation is linked to interrupt requests (IRQ). Furthermore, modern personal computers tend not to have UART standard interfaces any more, so that instead of this, it is necessary to resort to additional equipment in the form of interface converters for converting the UART interface on the field device into the interface on the personal computer, usually USB. When using such interface converters, it has been found that timing problems hampering communication arise as a result of design differences between the converted interfaces.

SUMMARY

A method for data transmission between a field device and an operating device is disclosed that avoids the disadvantages of the prior art.

A method for data transmission between a field device and an operating device is disclosed wherein the field device is designed to communicate with a higher-level device using a fieldbus protocol in order to perform an automation engineering task, and wherein the operating device is designed as a master for bit-serial point-to-point communication using a packet-based transmission protocol, the method comprising: the data to be transmitted is encoded according to the specification of the fieldbus protocol, and carried over the transmission channel using the packet-based transmission protocol.

DESCRIPTION OF THE DRAWINGS

The exemplary embodiments of the disclosure will be described with reference to the accompanying drawings; in which.

DETAILED DESCRIPTION

The disclosure is based on a field device that is designed to communicate with a higher-level device using a fieldbus protocol in order to perform an automation engineering task. In addition, the disclosure is based on an operating device that is designed as a master for bit-serial point-to-point communication using a packet-based transmission protocol.

According to the disclosure, the data to be transmitted is encoded according to the specification of the fieldbus protocol, and carried over the transmission channel using the packet-based transmission protocol. In detail, the data to be transmitted is encoded in the respective transmitter into the language of the implemented fieldbus protocol that is specific to the field device. Syntactic and semantic communication errors are avoided by using the fieldbus protocol already implemented in the field device for specification-compliant communication in the hierarchy of the automation engineering plant.

The encoded data to be transmitted is embedded in the packet-based transmission protocol of the operating device for carrying over the transmission channel, and transmitted. Converters can be dispensed with in this case, because the transmission protocol remains the same over the entire transmission channel. Timing problems caused by incompatibilities are thereby also avoided.

Further details and advantages of the disclosure are described in greater detail below with reference to an exemplary embodiment. In this case, a notebook is provided as the operating device, which has at least one USB interface, and on which an operating system runs that is equipped with drivers for operating this USB interface. The notebook acts as a USB host.

Figure 1:
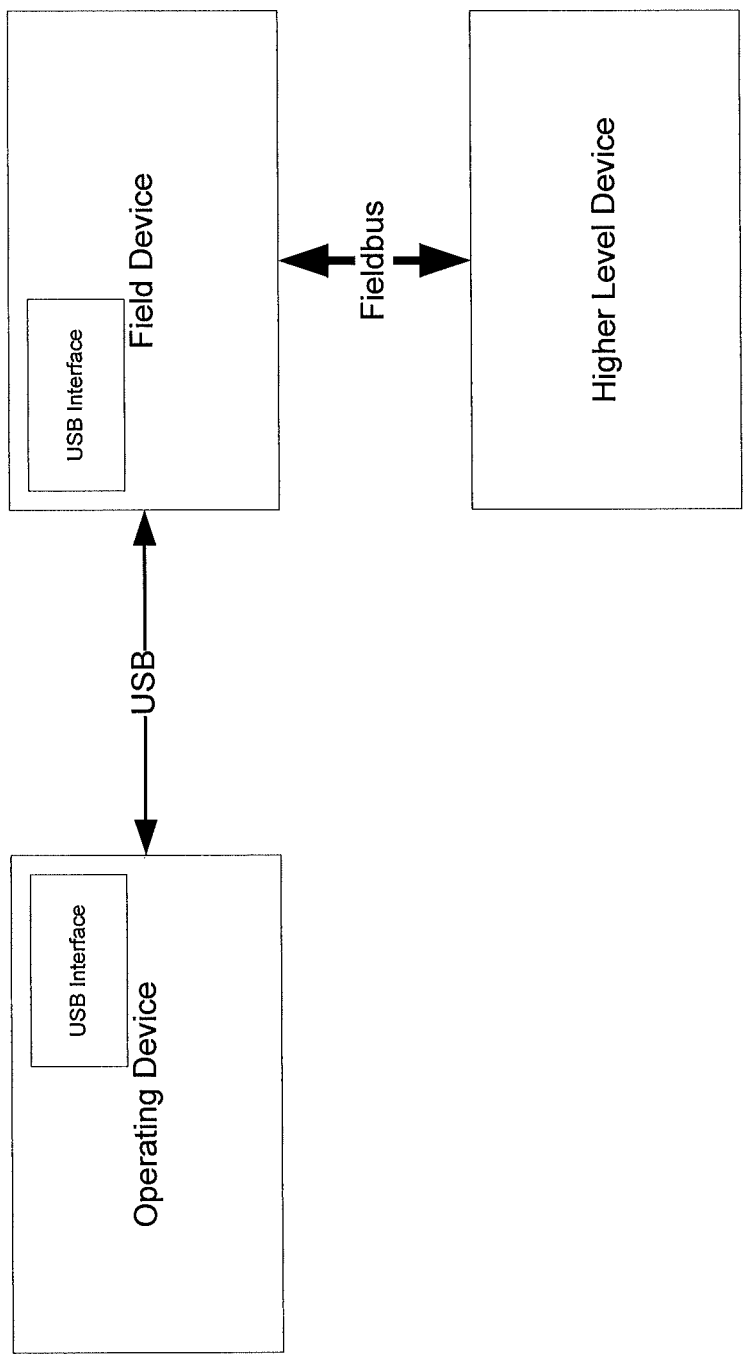
FIG. 1 illustrates a system in accordance with an exemplary embodiment.
Figure 2:
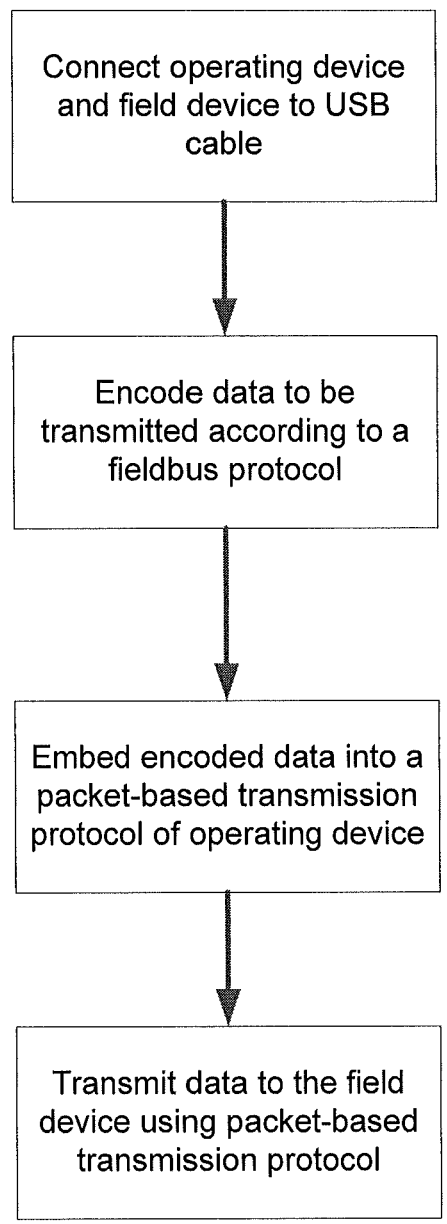
FIG. 2 illustrates a method for data transmission in accordance with an exemplary embodiment.

As shown in FIG. 1, a transducer for converting a physical quantity into an electrical quantity is provided as the field device, which is equipped with a microcontroller and has a USB interface, which can be operated via the microcontroller for the purpose of communication. The transducer is designed for communication in accordance with the rules of the HART specification.

The notebook and the transducer are connected to a commercial and standards-compliant USB cable. This cable is a four-core cable, with two wires being provided for the differential data transmission and two wires for the power supply of the USB device connected at the time. The transducer is supplied as a USB device via the USB cable from the USB host, the notebook. This means that a separate power supply for the transducer can be dispensed with. Instead, the power supply of the transducer is provided automatically on connection to the notebook. In the workshop or laboratory in particular, where the transducer is operated outside the automation engineering plant, and there is no transducer supply from the plant wiring, the cabling effort is minimal and particularly clear. This minimizes the probability of a mistake when connecting the devices together.

The notebook and the transducer communicate via the USB interface in accordance with the USB protocol. The data embedded in the USB protocol is encoded according to the HART specification. This encoding is performed on the part of the host by a software routine in the operating program. The transducer is designed for specification-compliant communication in accordance with the rules of the HART specification. The processors of commonly used microprocessor families are already equipped with an integral USB interface. Thus a small amount of engineering and development effort is sufficient to implement the theory according to the disclosure.

Another aspect of the disclosure is the higher transmission speed and the consequently shorter time for the maintenance procedure. The theoretical speed advantage equals a factor of 150 (9600 baud to 1.5 Mbit/s "low speed" USB), 1200 (9600 baud to 12 Mbit/s "full speed" USB) or 50 000 (9600 baud to 480 Mbit/s "Hi speed" USB). This speed advantage becomes noticeable in complex field devices in particular, in which the length of time in minutes taken to write and check the production data would hitherto extend into double figures, and which are fully configured within a few seconds on the basis of the theory of the disclosure.

This commercial advantage occurs both during production of the devices and later during configuration, commissioning, maintenance or updating firmware of the devices.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for data transmission between a field device and an operating device, comprising:

establishing a transmission channel between the field device and the operating device, wherein the transmission channel terminates at each device through respective Universal Serial Bus (USB) interfaces on each device;

configuring the field device to communicate with a higher-level device using a fieldbus protocol for performing an automation engineering task;

configuring the operating device as a master for bit-serial point-to-point communication using a packet-based transmission protocol;

encoding the data to be transmitted according to a Highway Addressable Remote Transducer (HART) protocol;

embedding the encoded data into the packet-based transmission protocol of the operating device; and transmitting the encoded data to the field device over the transmission channel using the packet-based transmission protocol; and supplying power to the field device over the transmission channel.

2. The method as claimed in claim 1, wherein the data to be encoded is carried over the transmission channel using the USB protocol.

3. A procedure for configuring a field device and an operating device for data transmission, comprising:

establishing a transmission channel between the field device and the operating device, wherein the transmission channel terminates at each device through respective Universal Serial Bus (USB) interfaces on each device;

configuring the field device to communicate with a higher-level device using a fieldbus protocol for performing an automation engineering task, configuring the operating device as a master for bit-serial point-to-point communication using a packet-based transmission protocol, and communicating data packets and power over the transmission channel, the data packets having embedded configuration data that is encoded according to a Highway Addressable Remote Transducer (HART) protocol, wherein the data packets are transmitted according to a packet-based transmission protocol.

\* \* \* \* \*